Nov. 11, 1941.  G. L. N. MEYER  2,262,030
PASTEURIZER
Filed March 6, 1939  2 Sheets-Sheet 1
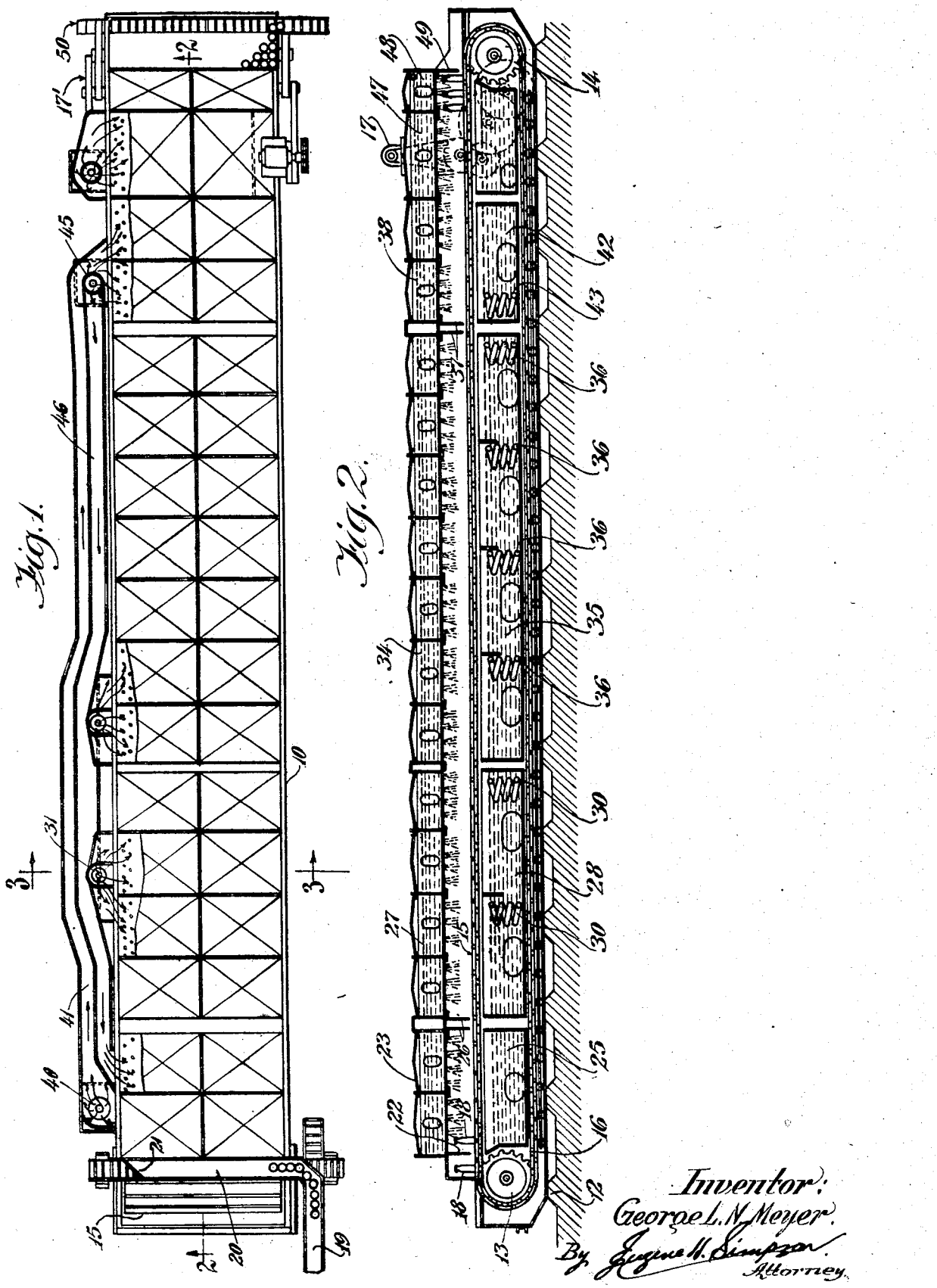
Inventor:
George L. N. Meyer.
By Eugene M. Simpson
Attorney Nov. 11, 1941.    G. L. N. MEYER    2,262,030
PASTEURIZER
Filed March 6, 1939.    2 Sheets-Sheet 2
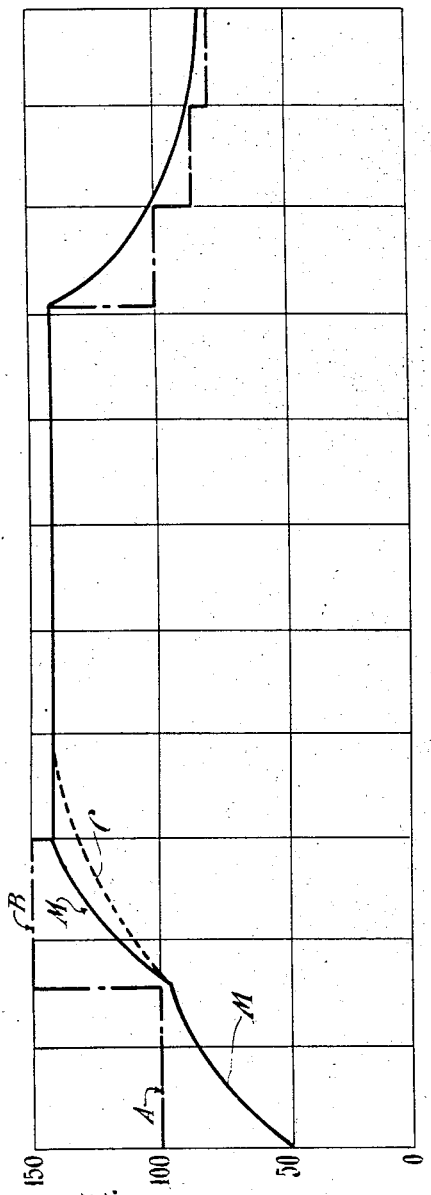
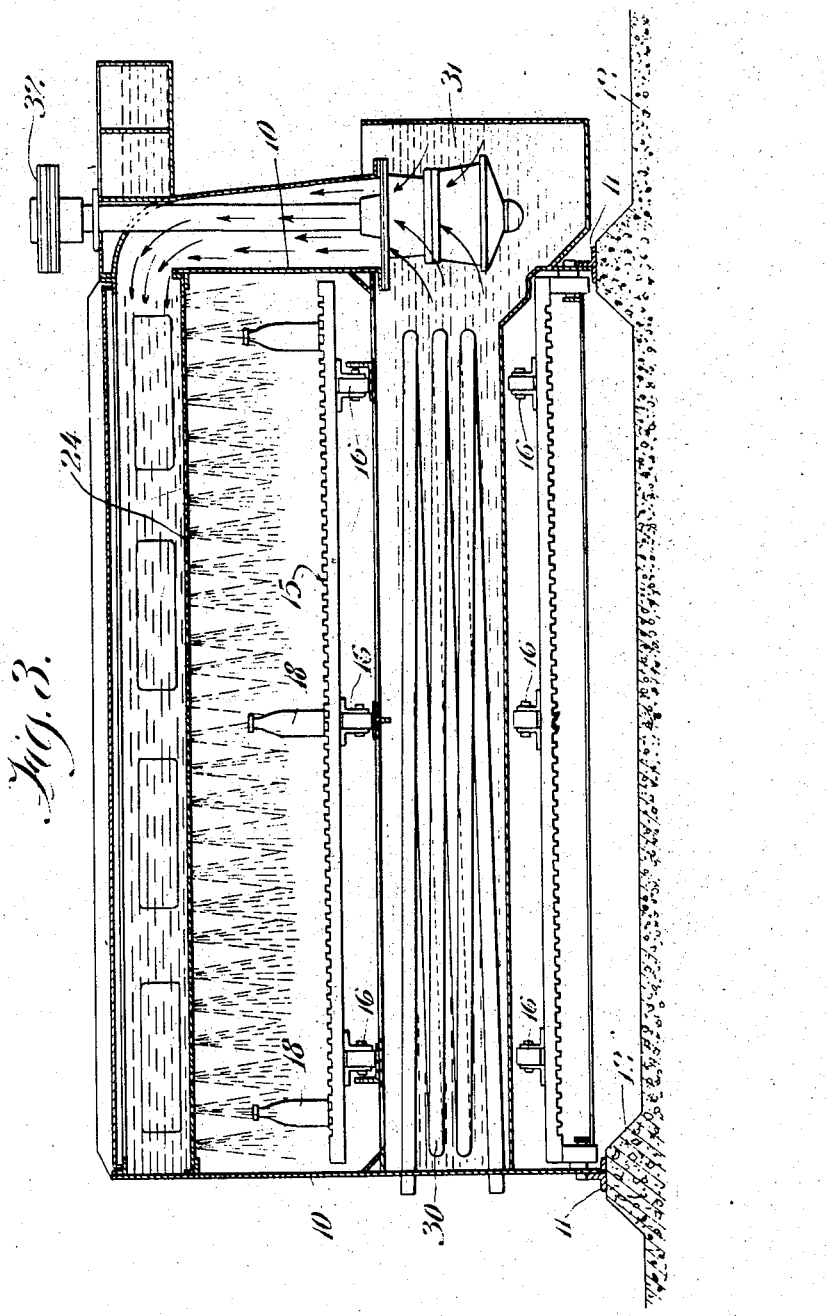
Inventor:
George L. N. Meyer
By Eugene H. Simpson
Attorney.

Patented Nov. 11, 1941

2,262,030

UNITED STATES PATENT OFFICE 2,262,030

PASTEURIZER

George L. N. Meyer, Milwaukee, Wis.

Application March 6, 1939, Serial No. 260,123

3 Claims. (Cl. 126—272)

This invention relates to pasteurizers and more particularly to a pasteurizer adapted to pasteurize the contents of containers by subjecting the containers to a heated liquid spray.

In pasteurizers heretofore used employing a spray bath of heated liquid over continuously moving containers, undue time has been consumed in bringing the contents of the containers up to a pasteurizing temperature. This is especially difficult where glass containers are used, as care must be taken to prevent the glass containers from cracking under the changes in temperature.

One object of the present invention is to reduce the overall length of pasteurizers.

Another object is to reduce the time containers are in the pasteurizer.

A further object is to increase the capacity of pasteurizers of the spray type.

A further object is to reduce the time required to raise the contents of the containers to pasteurizing temperature.

Other objects will become apparent upon considering the following specification.

In the drawings:

Fig. 1 is a plan view of a pasteurizer with parts being shown in cross-section to more clearly illustrate certain other parts;

Fig. 2 is an elevational cross-section taken on the line 2—2 of Fig. 1;

Fig. 3 is an enlarged transverse cross-section taken on the line 3—3 of Fig. 1; and Fig. 4 is a chart showing the relationship of the temperature of the container contents to the heating medium.

In the drawings, in which like numerals indicate like parts throughout the several views, the pasteurizer is built between side walls 10 which are connected to suitable structural sections 11 at the lower end which support the pasteurizer from a foundation 12.

Sprocket wheels 13 and 14 are mounted in the loading and discharge ends respectively of the pasteurizer and carry a conveyor 15 which is mounted on a plurality of chains 16 operable over the sprocket wheels.

The conveyor is driven from a motor 17, mounted adjacent the discharge end, which turns the sprocket wheel 14 at that end of the machine through a driving mechanism 17'.

Containers 18 enter the loading end of the pasteurizer on a conveyor 19 which delivers the containers onto a transverse loading conveyor 20. The containers 18 are squeezed off the loading conveyor 20 by means of a deflecting plate 21 in a manner best shown and described in applicant's co-pending application Serial No. 238,203, filed November 31, 1938, entitled "Conveyors."

The containers are moved through the pasteurizer on the conveyor 15 which travels at constant speed between the sprocket wheel 13 at the loading end and the sprocket wheel 14 adjacent the discharge end. As the containers enter the pasteurizing chamber they pass through a fringed rubber curtain 22 which permits the containers to pass through while conserving the heat within the pasteurizer.

As the containers enter the pasteurizing chamber through the curtain 22 they are subjected to a water spray from a tank 23 which contains water at a temperature high enough to adequately heat the contents of the containers but not hot enough to fracture glass containers. The spray from the tank 23 is formed by a large number of small apertures 24 formed in the bottom of the tank through which the water in the tank sprays or cascades over the containers 18 passing beneath the tank. A suitable temperature for this spray has been found to be 100° F. as is shown by the line A of Fig. 4.

This initial spray heats the containers rapidly at first and with decreasing efficiency as the temperature of the contents of the containers approaches that of the spray, the temperature of the contents of the containers being shown at M in Fig. 4. After the water from the spray tank 23 has cascaded over the containers 18 it passes through the apertures in the conveyor 15 and drops into a receiving tank 25 which is supported between the side walls 10 of the pasteurizer and positioned between the flights of the conveyor 15.

As the containers 18 pass beyond the spray of the tank 23 they pass through one or more fringed rubber curtains 26 similar to the curtain 22 and under a spray from a tank 27. The water in the tank 27 is maintained above pasteurizing temperature so as to increase the differential between the spray temperature and the temperature of the contents of the containers and thus decrease the time required to raise the temperature of the contents of the containers to the necessary pasteurizing temperature. By so decreasing the time required to raise the contents to pasteurizing temperature the pasteurizer can be shortened considerably or may be made to have an increased capacity for the same size machine.

The water in the tank 27 flows out through small holes in the bottom of the tank, cascades over the containers 18 and drops into a tank 28 situated between the flights of the conveyor 15 and directly beneath the tank 27. The tank 28 is suitably supported between the side walls 10 in a manner similar to the tank 25. As the water from the tank 27 cascades over the containers 18 a heat exchange is effected between the water and the contents of the containers heating the contents and cooling the water. To compensate for this loss of heat heating coils 30—30 are placed across the width of the tank 28 to reheat the water which falls therein. The water from the tank 28 is thus heated and recirculated to the tank 27 by a pump 31 which may be driven by a motor situated adjacent the top of the pasteurizer, and not shown, which operates a pulley 32 shown in Fig. 3.

The speed of the conveyor 15 is so regulated that as the contents of the containers 18 attains pasteurizing temperature, which for beer is 140° Fahrenheit, the containers pass from beneath the tank 27 and under a tank 34 which sprays water over the containers at pasteurizing temperature and thus maintains the heat in the containers constant for the desired pasteurizing time.

As the water passes over the containers it drops into a receiving tank 35 which is supported between the side walls 10 of the pasteurizer in a manner similar to the tanks 25 and 28 and is situated between the flights of the conveyor 15. Heating coils 36 are located in the water in the tank 35 to compensate for any loss of heat suffered by the water in spraying over the containers or due to radiation to the atmosphere. At the end of the tank 34 the containers pass through fringed rubber curtains 37 and into a cooling spray from a tank 38. Water for the tank 38 is obtained from the tank 25 which receives the water from the tank 23 after it has been cooled by contact with the relatively cool containers 18. Water from the tank 25 is pumped by a pump 40 through a conduit 41 and into the tank 38. As the water from the tank 38 cascades over the containers which are at pasteurizing temperature a heat exchange takes place and the cascading water is heated while the containers are cooled. The heated water drops into a tank 42 where it may be heated further by a coil 43. The tank 42 is similar to the tanks 25, 28 and 35 in that it is supported by the side walls 10 of the pasteurizer and situated between the flights of the conveyor 15. Water from the receiving tank 42 which has been further heated by the coil 43 is transmitted by a pump 45 through a conduit 46 and delivered to the spray tank 23 where it is used to give the initial spray over the containers.

After being suitably cooled by the spray from the tank 38 the containers pass under further sprays from tanks 47 and 48 and pass out through a curtain 49 onto an unloading conveyor 50. Details of the unloading conveyors are best shown in applicant's co-pending application Serial No. 114,899, filed December 9, 1936, and entitled "Conveyors."

In Fig. 4 the curve C shows the temperature of the contents of the containers in a pasteurizer using a spray of pasteurizing temperature directly after the initial warming spray A. It will be noted that the contents of the containers attains pasteurizing temperature at a considerable later point in the pasteurizer when no super-heated spray is used than in the present machine, and since pasteurization does not begin until full pasteurizing temperature is attained it follows that the pasteurizer built with a super-heating zone may be shortened accordingly. The super-heating has a further beneficial effect in that it brings the contents of the containers to pasteurizing temperature rapidly and thus prevents undue cooking due to maintaining the heat at pasteurizing temperatures for longer periods of time than is necessary.

Having thus described the invention it will be realized that it is susceptible to various changes and modifications and that, for example, a second super-heat zone could be added as the temperature of the contents of the containers approaches that of the first super-heat zone. The addition of such a second super-heat zone would somewhat accelerate the heating of the containers and this subject matter is being reserved for a further patent application. It is not therefore desired to limit this invention to the precise form shown and described in the specification but only by the scope of the appended claims.

Having thus described the invention it is hereby claimed as follows:

1. In a pasteurizer of the character described, a conveyor adapted to travel horizontally through said pasteurizer, means to load containers onto said conveyor, means to move said conveyor and containers through said pasteurizer, a first plurality of sprays adapted to spray liquid at a temperature lower than pasteurizing temperature over said containers, a second plurality of sprays adapted to spray liquid over the containers, said liquid from said second sprays being of higher temperature than pasteurizing temperature to raise the temperature of the contents of the containers quickly to pasteurizing temperature, and a third plurality of sprays adapted to spray liquid at pasteurizing temperature onto said containers to maintain the pasteurizing temperature therein.

2. In a pasteurizer of the character described, a conveyor adapted to travel horizontally through said pasteurizer, means to load containers onto said conveyor, means to move said conveyor and containers through said pasteurizer, a first plurality of sprays adapted to spray liquid at a temperature below pasteurizing temperature over said containers, a second plurality of sprays adapted to spray liquid over said containers, the liquid from said second liquid sprays being of higher temperature than pasteurizing temperature to raise the temperature of the contents of the containers quickly to pasteurizing temperature, a third plurality of sprays adapted to spray liquid at pasteurizing temperature onto said containers to maintain the pasteurizing temperature therein, and a fourth plurality of sprays adapted to spray cooling liquid over said containers to reduce the temperature thereof.

3. A pasteurizer for edible products in containers comprising means for establishing a preliminary heating zone in which a temperature below pasteurizing temperature is maintained and which is adapted to raise the temperature of the product being pasteurized to a point below that necessary to pasteurize, a super-heat zone in which a temperature above pasteurizing temperature is maintained and which is adapted to raise the temperature of the product quickly to pasteurizing heat, and a pasteurizing zone adapted to maintain the pasteurizing heat for a desired time, and means to transport the product through said zones in the order named.

GEORGE L. N. MEYER.